United States Patent [19]

Haluska

[11] Patent Number: 4,546,163
[45] Date of Patent: Oct. 8, 1985

[54] SILICON CARBIDE PRECERAMIC VINYL-CONTAINING POLYMERS

[75] Inventor: Loren A. Haluska, Midland, Mich.

[73] Assignee: Dow Corning Corporation, Midland, Mich.

[21] Appl. No.: 647,329

[22] Filed: Sep. 4, 1984

[51] Int. Cl.$^4$ ............................................. C08G 77/06
[52] U.S. Cl. ...................................... 528/14; 423/345; 528/19; 528/21; 528/23; 528/25; 528/29
[58] Field of Search ...................... 528/19, 21, 23, 14, 528/25, 29; 423/345

[56] References Cited

U.S. PATENT DOCUMENTS

| | | | |
|---|---|---|---|
| Re. 31,447 | 11/1983 | Baney et al. | 528/13 |
| 4,260,780 | 4/1981 | West | 556/430 |
| 4,298,559 | 11/1981 | Baney | 427/387 |
| 4,310,651 | 1/1982 | Baney et al. | 528/23 |
| 4,314,956 | 2/1982 | Baney et al. | 556/430 |

OTHER PUBLICATIONS

Baney et al., "Methylchloropolysilanes and Derivatives Prepared from the Redistribution of Methylchlorodisilanes," Organometallics, vol. 2, No. 5, pp. 859–864, May 1983.

*Primary Examiner*—Melvyn I. Marquis
*Attorney, Agent, or Firm*—Richard A. Kaba

[57] ABSTRACT

Vinyl-containing polysilanes of the average formula

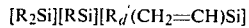

$[R_2Si][RSi][R_d'(CH_2=CH)Si]$ where R is an alkyl radical containing 1 to 4 carbon atoms, R' is an alkyl radical containing 1 to 4 carbon atoms, a vinyl radical, or a phenyl radical, d is 1 or 2 and where the polysilane contains 0 to 60 mole percent $[R_2Si]$ units, 30 to 99.5 mole percent $[RSi]$ units, and 0.5 to 15 mole percent $[R_d'(CH_2=CH)Si]$ units are disclosed. The vinyl-containing polysilanes may be converted to silicon carbide-containing ceramics by pyrolysis in an inert atmosphere or in a vacuum at temperatures greater than 800° C. Shaped articles prepared from the vinyl-containing polysilanes may be rendered infusible prior to pyrolysis by exposure to air or ultraviolet light.

35 Claims, No Drawings

SILICON CARBIDE PRECERAMIC VINYL-CONTAINING POLYMERS

STATEMENT OF GOVERNMENT RIGHTS

The Government has rights in this invention pursuant to Contract No. F33615-C-5006 awarded by the United States Air Force.

BACKGROUND OF THE INVENTION

This invention relates to polysilanes of the average formula $$[RSi][R_2Si][R_d{'}(CH_2\!=\!CH)Si]$$

where there is present 0 to 60 mole percent of [$R_2Si$] units, 30 to 99.5 mole percent of [RSi] units, and 0.5 to 15 mole percent of [$R_d{'}(CH_2\!=\!CH)Si$] units. This invention also relates to the methods of preparing such polysilanes as well as silicon carbide ceramics prepared from such polysilanes. The vinyl-containing polysilanes of this invention may be rendered infusible by exposure to UV irradiation in an inert atmosphere prior to pyrolysis to form ceramic material. Such cure mechanisms can result in ceramic materials containing only limited amounts of oxygen.

Baney et al. in U.S. Pat. No. 4,310,651 (issued Jan. 12, 1982) disclosed a polysilane of general formula $$[CH_3Si][(CH_3)_2Si]$$

where there was present 0 to 60 mole percent [$(CH_3)_2Si$] units and 40 to 100 mole percent [$CH_3Si$] units and where the remaining bonds on silicon were attached to other silicon atoms and chlorine atoms or bromine atoms. The polysilane was converted to a beta-silicon carbide containing ceramic at elevated temperatures (about 1400°0 C.). The polysilanes of U.S. Pat. No. 4,310,651 generally are difficult to handle due to their high reactivity in air.

Baney et al. in U.S. Pat. No. 4,298,559 (issued Nov. 3, 1981) prepared polysilanes of general formula $$[CH_3Si][(CH_3)_2Si]$$

where there was present 0 to 60 mole percent [$(CH_3)_2Si$] units and 40 to 100 mole percent [$CH_3Si$] units and where the remaining bonds on silicon were attached to other silicon atoms and additional alkyl radicals of 1 to 4 carbon atoms or phenyl radicals. Upon heating these polysilanes were converted into silicon carbide containing ceramics in high yields.

Baney et al. in U.S. Reissue Pat. No. Re. 31,447 (reissued Nov. 22, 1983) disclosed polysilanes of the general formula $$[CH_3Si][(CH_3)_2Si]$$

where there was present 0 to 60 mole percent [$(CH_3)_2Si$] units and 40 to 100 mole percent [$CH_3Si$] units and where the remaining bonds on silicon were attached to other silicon atoms and alkoxy radicals containing 1 to 4 carbon atoms or phenoxy radicals. Silicon carbide ceramics were obtained by firing these polysilanes to elevated temperatures.

Baney et al. in U.S. Pat. No. 4,314,956 (issued Feb. 9, 1982) disclosed polysilanes of the general formula $$[CH_3Si][(CH_3)_2Si]$$

where there was present 0 to 60 mole percent [$(CH_3)_2Si$] units and 40 to 100 mole percent [$CH_3Si$] units and where the remaining bonds on silicon were attached to silicon and amine radicals of the general formula $-NHR^{vi}$ where $R^{vi}$ is a hydrogen atom, an alkyl radical of 1 to 4 carbon atoms or a phenyl radical. A silicon carbide ceramic was obtained by firing this polysilane to an elevated temperature under an inert atmosphere or under an ammonia atmosphere.

The just disclosed U.S. Pat. Nos. 4,310,651; 4,298,599; Re 31,447; and 4,314,956 are hereby incorporated by reference. These polysilanes are further discussed in Baney et al. *Organometallics*, 2, 859 (1983).

West in U.S. Pat. No. 4,260,780 (issued Apr. 7, 1981) prepared a polysilane of general formula $$[(CH_3)_2Si][CH_3(C_6H_5)Si]$$

by the sodium metal reduction of dimethyldichlorosilane and methylphenylsilane. The resulting methylphenylpolysilanes had very high softening points (>280° C.).

West et al. in *Polym. Prepr.*, 25, 4 (1984) disclosed the preparation of a polysilane of general formula $$[CH_3(CH_2\!=\!CHCH_2)Si][CH_3(C_6H_5)Si]$$

by the sodium metal reduction of allylmethyldichlorosilane and methylphenyldichlorosilane. These polysilanes were rapidly gelled by irradiation with ultraviolet light.

It has now been determined that polysilanes of the average formula $$[RSi][R_2Si][R_d{'}(CH_2\!=\!CH)Si]$$

may be prepared in good yield. These polysilanes may be pyrolyzed at elevated temperatures in an inert atmosphere to produce silicon carbide-containing ceramics. The polysilanes may be cured, and thus rendered infusible, prior to pyrolysis by exposure to ultraviolet light.

THE INVENTION

This invention relates to a method of preparing a polysilane having the average formula $$[R_2Si][RSi][R_d{'}(CH_2\!=\!CH)Si]$$

wherein the remaining bonds on silicon are attached to other silicon atoms and chlorine atoms or bromine atoms, said method consisting of treating a mixture consisting essentially of 80 to 99 weight percent of one or more disilanes of general formula $$[R_bX_cSi]_2$$

and 1 to 20 weight percent of one or more silanes of general formula $$R_d{'}(CH_2\!=\!CH)SiX_{(3-d)}$$

with about 0.1 to 10 weight percent of a catalyst at a temperature of about 100° to 340° C. while distilling byproduced volatile materials until there is produced a chlorine-containing or bromine-containing polysilane, which is a solid at 25° C., having the average formula $$[R_2Si][RSi][R_d{'}(CH_2\!=\!CH)Si]$$

in which polysilane there is from 0 to 60 mole percent [R$_2$Si] units, 30 to 99.5 mole percent [RSi] units, 0.5 to 15 mole percent [R$_d'$(CH$_2$=CH)Si] units, and wherein the remaining bonds on silicon in said polysilane are attached to other silicon atoms and chlorine atoms or bromine atoms; wherein said catalyst is selected from the group consisting of ammonium halides, tertiary organic amines, quaternary ammonium halides, quaternary phosphonium halides, hexamethylphosphoramide and silver cyanide; wherein R is an alkyl radical containing from 1 to 4 carbon atoms; wherein b has a value of 0 to 2.5, c has a value of 0.5 to 3, and (b+c) equals three; wherein X is chlorine or bromine; wherein R' is an alkyl radical containing 1 to 4 carbon atoms, a vinyl radical, or a phenyl radical; wherein d is 1 or 2; and wherein said one or more silanes have a boiling point of greater than 100° C. at 760 mm Hg. The polysilane produced by this just described method will be referred to in this specification as a chlorine-endblocked or bromine-endblocked vinyl-containing polysilane.

This invention also relates to a method of preparing a second polysilane having the average formula

[R$_2$Si][RSi][R$_d'$(CH$_2$=CH)Si]

wherein the remaining bonds on silicon are attached to other silicon atoms and alkyl radicals of 1 to 4 carbon atoms, vinyl radicals, or phenyl radicals, which method consists of (A) reacting under anhydrous conditions, the chlorine-endblocked or bromine-endblocked vinyl-containing polysilane described earlier with an alkyl, vinyl or phenyl Grignard reagent having the general formula R'MgX' or an organolithium compound having the general formula R'Li where X' is chlorine or bromine and R' is an alkyl radical containing 1 to 4 carbon atoms, a vinyl radical, or a phenyl radical, at a temperature of 0° to 120° C., in a suitable solvent, and (B) thereafter recovering the second polysilane of average formula

[R$_2$Si][RSi][R$_d'$(CH$_2$=CH)Si]

in which second polysilane there is from 0 to 60 mole percent [R$_2$Si] units, 30 to 99.5 mole percent [RSi] units, 0.5 to 15 mole percent [R$_d'$(CH$_2$=CH)Si] units, and wherein the remaining bonds on silicon in said second polysilane are attached to other silicon atoms and alkyl radicals of 1 to 4 carbon atoms, vinyl radicals, or phenyl radicals.

This invention also relates to a method of preparing a third polysilane having the average formula

[R$_2$Si][RSi][R$_d'$(CH$_2$=CH)Si]

wherein the remaining bonds on silicon are attached to other silicon atoms and radicals having the formula R'''O— or R$^{iv}$O— where R''' is an alkyl radical containing 1 to 4 carbon atoms or a phenyl radical and R$^{iv}$ is an alkyl radical containing 1 to 4 carbon atoms, which method consists of (A) reacting under anhydrous conditions, the chlorine-endblocked or bromine-endblocked vinyl-containing polysilane described earlier with a reagent selected from the group consisting of (i) carbinols having the general formula R'''OH, (ii) alcoholates having the general formula R'''OM, and (iii) alkyl orthoformates having the general formula (R$^{iv}$O)$_3$CH wherein R''' is an alkyl radical containing 1 to 4 carbon atoms or a phenyl radical, R$^{iv}$ is an alkyl radical containing 1 to 4 carbon atoms, and M is sodium, potassium, or lithium, at a temperature of 0° to 110° C., in a suitable solvent, and (B) thereafter recovering the third polysilane of average formula

[R$_2$Si][RSi][R$_d'$(CH$_2$=CH)Si]

in which third polysilane there is from 0 to 60 mole percent [R$_2$Si] units, 30 to 99.5 mole percent [RSi] units, 0.5 to 15 mole percent [R$_d'$(CH$_2$=CH)Si] units, and wherein the remaining bonds on silicon in said third polysilane are attached to other silicon atoms and R'''O— or R$^{iv}$O— radicals.

This invention also relates to a method of preparing a fourth polysilane having the average formula

[R$_2$Si][RSi][R$_d'$(CH$_2$=CH)Si]

wherein the remaining bonds on silicon are attached to other silicon atoms and radicals having the formula —NHR$^v$ wherein R$^v$ is hydrogen, an alkyl radical containing 1 to 4 carbon atoms, a phenyl radical or a —SiR$_3$ radical, wherein R is an alkyl radical containing 1 to 4 carbon atoms, a vinyl radical, or a phenyl radical which method consists of (A) reacting under anhydrous conditions, the chlorine-endblocked or bromine-endblocked vinyl-containing polysilane described earlier with an aminolysis reagent having the general formula NHR$_2^v$ wherein R$^v$ is hydrogen, an alkyl radical containing 1 to 4 carbon atoms, a phenyl radical or a —SiR$_3$ radical wherein R is an alkyl radical containing 1 to 4 carbon atoms, a vinyl radical, or a phenyl radical, at a temperature of from 25° to 100° C., in a suitable solvent, and (B) thereafter recovering the fourth polysilane of average formula

[R$_2$Si][RSi][R$_d'$(CH$_2$=CH)Si]

in which fourth polysilane there is from 0 to 60 mole percent [R$_2$Si] units, 30 to 99.5 mole percent [RSi] units, 0.5 to 15 mole percent [R$_d'$(CH$_2$=CH)Si] units, and wherein the remaining bonds on silicon in said fourth polysilane are attached to other silicon atoms and —NHR$^v$ radicals.

This invention further relates to a polysilane of the average formula

[R$_2$Si][RSi][R$_d'$(CH$_2$=CH)Si]

in which polysilane there is from 0 to 60 mole percent [R$_2$Si] units, 30 to 99.5 mole percent [RSi] units and 0.5 to 15 mole percent [R$_d'$(CH$_2$=CH)Si] units, where the remaining bonds on silicon are attached to other silicon atoms, and alkyl radicals of 1 to 4 carbon atoms, vinyl radicals or phenyl radicals wherein R is an alkyl radical containing 1 to 4 carbon atoms, R' is an alkyl radical containing 1 to 4 carbon atoms, a vinyl radical, or a phenyl radical, and d is 1 or 2.

This invention further relates to a polysilane of the average formula

[R$_2$Si][RSi][R$_d'$(CH$_2$—CH)Si]

in which polysilane there is from 0 to 60 mole percent [R$_2$Si] units, 30 to 99.5 mole percent [RSi] units and 0.5 to 15 mole percent [R$_d'$(CH$_2$=CH)Si] units wherein the remaining bonds on silicon are attached to other silicon atoms and radicals having formula R'''O—, wherein R is an alkyl radical containing 1 to 4 carbon atoms, R' is an alkyl radical containing 1 to 4 carbon atoms, a vinyl radical or a phenyl radical, d is 1 or 2, and R''' is an alkyl radical containing 1 to 4 carbon atoms or a phenyl radical.

This invention further relates to a polysilane of the average formula $$[R_2Si][RSi][R_d'(CH_2=CH)Si]$$

in which polysilane there are from 0 to 60 mole percent [R_2Si] units, 30 to 99.5 mole percent [RSi] units, and 0.5 to 15 mole percent [R_d'(CH_2=CH)Si] units wherein the remaining bonds on silicon are attached to other silicon atoms and —NHR$^v$ radicals wherein R is an alkyl radical containing 1 to 4 carbon atoms, R' is an alkyl radical containing 1 to 4 carbon atoms, a vinyl radical or a phenyl radical, d is 1 or 2, and R$^v$ is hydrogen, an alkyl radical containing 1 to 4 carbon atoms, a phenyl radical or a —SiR_3 radical.

This invention still further relates to a method of preparing a silicon carbide-containing ceramic article, said method comprising (A) forming an article of the desired shape from a polysilane of the average formula $$[R_2Si][RSi][R_d'(CH_2=CH)Si]$$

in which polysilane there is from 0 to 60 mole percent [R_2Si] units, 30 to 99.5 mole percent [RSi] units and 0.5 to 15 mole percent [R_d'(CH_2=CH)Si] units, where the remaining bonds on silicon are attached to other silicon atoms and alkyl radicals of 1 to 4 carbon atoms, vinyl radicals or phenyl radicals wherein R is an alkyl radical containing 1 to 4 carbon atoms, R' is an alkyl radical containing 1 to 4 carbon atoms, a vinyl radical, or a phenyl radical, and d is 1 or 2; and (B) heating the article formed in (A) in an inert atmosphere or in a vacuum to an elevated temperature greater than 800° C. until the polysilane is converted to silicon carbide-containing ceramic article.

This invention still further relates to a method of preparing a silicon carbide-containing ceramic article, said method comprising (A) forming an article of the desired shape from a polysilane of the average formula $$[R_2Si][RSi][R_d'(CH_2=CH)Si]$$

in which polysilane there is from 0 to 60 mole percent [R_2Si] units, 30 to 99.5 mole percent [RSi] units and 0.5 to 15 mole percent [R_d'(CH_2=CH)Si] units wherein the remaining bonds on silicon are attached to other silicon atoms and radicals having formula R'''O—, wherein R is an alkyl radical containing 1 to 4 carbon atoms, R' is an alkyl radical containing 1 to 4 carbon atoms, a vinyl radical or a phenyl radical, d is 1 or 2, and R''' is an alkyl radical containing 1 to 4 carbon atoms or a phenyl radical; and (B) heating the article formed in (A) in an inert atmosphere or in a vacuum to an elevated temperature greater than 800° C. until the polysilane is converted to silicon carbide-containing ceramic article.

This invention still further relates to a method of preparing a silicon carbide-containing ceramic article, said method comprising (A) forming an article of the desired shape from a polysilane of the average formula $$[R_2Si][RSi][R_d'(CH_2=CH)Si]$$

in which polysilane there are from 0 to 60 mole percent [R_2Si] units, 30 to 99.5 mole percent [RSi] units, and 0.5 to 15 mole percent [R_d'(CH_2=CH)Si] units wherein the remaining bonds on silicon are attached to other silicon atoms and —NHR$^v$ radicals wherein R is an alkyl radical containing 1 to 4 carbon atoms, R' is an alkyl radical containing 1 to 4 carbon atoms, a vinyl radical or a phenyl radical, d is 1 or 2, and R$^v$ is hydrogen, an alkyl radical containing 1 to 4 carbon atoms, a phenyl radical or a —SiR_3 radical; and (B) heating the article formed in (A) in an inert atmosphere or in a vacuum to an elevated temperature greater than 800° C. until the polysilane is converted to silicon carbide-containing ceramic article.

The polysilanes of this invention are described by the average formula $$[R_2Si][RSi][R_d'(CH_2=CH)Si].$$

One such polysilane is a chlorine-endblocked or bromine-endblocked vinyl-containing polysilane wherein the remaining bonds on silicon are attached to other silicon atoms and chlorine atoms or bromine atoms. The chlorine-endblocked or bromine-endblocked vinyl-containing polysilane may be prepared by reacting a mixture of about 80–99 weight percent of one or more chlorine-containing or bromine-containing disilanes and 1 to 20 weight percent of one or more vinyl-containing silanes with about 0.1 to 10 weight percent of a catalyst at a temperature of about 100° to 340° C. while distilling byproduced volatile materials.

The chlorine-containing or bromine-containing disilanes are of the general formula $$[R_bX_cSi]_2$$

wherein R is an alkyl radical containing from 1 to 4 carbon atoms, b has a value of 0 to 2.5, c has a value of 0.5 to 3, the sum (b+c) equals three, and X is chlorine or bromine. R in the above disilane may be methyl, ethyl, propyl or butyl. Examples of such disilanes include (CH_3)_2ClSiSiCl(CH_3)_2, CH_3Cl_2SiSiCl(CH_3)_2, CH_3Cl_2SiSiCl_2CH_3, (CH_3)_2BrSiSiBr(CH_3)_2, CH_3Br_2SiSiBr(CH_3)_2, CH_3Br_2SiSiBr_2CH_3 and the like. Preferably in the above disilane R is a methyl radical and X is chlorine. The disilane can be prepared from the appropriate silanes or the disilane can be utilized as it is found as a component of the process residue from the direct synthesis of organochlorosilanes. The direct synthesis of organochlorosilanes involves passing the vapor of an organic chloride over heated silicon and a catalyst. See Eaborn, "Organosilicon Compounds," Butterworths Scientific Publications, 1960, page 1. The disilane CH_3Cl_2SiSiCl(CH_3)_2 is found in large quantities in the residue from the reaction and therefore, this Direct Process Residue (DPR) is a good starting material for obtaining the polysilane polymer used in this invention.

The vinyl-containing silanes are of the general formula $$R_d'(CH_2=CH)SiX_{(3-d)}$$

wherein R' is an alkyl radical containing 1 to 4 carbon atoms, a vinyl radical, or a phenyl radical, d is 1 or 2, and X is either bromine or chlorine. The vinyl- containing silane must have a boiling point greater than 100° C. at 760 mm Hg. Preferably, the vinyl-containing silane has a boiling point greater than 150° C. at 760 mm Hg. Examples of suitable vinyl-containing silanes include (CH_2=CH)_2SiCl_2, (CH_2=CH)(C_2H_5)SiCl_2, CH_3(C_2H_5)(CH_2=CH)SiCl, (CH_2=CH)(C_4H_9)SiCl_2, (CH_2=CH)(C_2H_5)_2SiCl, (CH_2=CH)(C_6H_5)SiCl_2, CH₃(CH₂=CH)(C₆H₅)SiCl, (CH₂=CH)(C₆H₅)₂SiCl, and the like. One preferred vinyl-containing silane is vinylphenyldichlorosilane with a boiling point of 121° C. at 36 mm Hg. Mixtures of suitable silanes may be employed.

The chlorine-containing or bromine containing disilanes and the vinyl-containing silane are reacted in the presence of a rearrangement catalyst. Suitable rearrangement catalysts include ammonium halides, tertiary organic amines, quaternary ammonium halides, quaternary phosphonium halides, hexamethylphosphoramide and silver cyanide. Preferred catalyst includes quaternary ammonium halide having the formula $R_4''NX'$, quaternary phosphonium halides having the formula $R_4''PX'$, and hexamethylphosphoramide where $R''$ is an alkyl radical containing 1 to 6 carbon atoms or a phenyl radical and $X'$ is chlorine or bromine.

The amount of catalyst utilized can range from 0.001 to 10 weight percent and preferably from 0.1 to 10 weight percent based on the weight of the starting disilane and vinyl-containing silane. The catalysts and starting materials require anhydrous conditions and therefore one must take care to insure that moisture is excluded from the reaction system when the disilane, vinyl-containing silane, and catalyst are mixed. Generally this can be done by using a stream of dry nitrogen or argon as a cover over the reaction mixture.

The mixture of about 80 to 99 weight percent disilane or mixture of disilanes and 1 to 20 weight percent vinyl-containing chlorosilane or mixture of vinyl-containing chlorosilanes are reacted in the presence of 0.1 to 10 weight percent of a rearrangement catalyst at a temperature of 100° to 340° C. while distilling byproduced volatile materials until there is produced the chlorine-containing or bromine-containing polysilane of this invention. The order of mixing the reactants is not critical. Preferably the reaction temperature is from 150° C. to 340° C. When using a vinyl-containing chlorosilane with a relatively low boiling point (i.e., between 100° and 150° C.) care should be taken to prevent the vinyl-containing chlorosilane from being distilled out of the reaction mixture before it has sufficient time to react with the disilanes. Such potential problems may be avoided, for example, by keeping the reaction temperature at the low end of the 100° to 340° C. range during the initial portion of the reaction and then raising the temperature slowly to the desired final temperature or by running the reaction, especially the early part, under a pressure greater than one atmosphere or by using reflux condition for the early stages of the reaction and then removing the byproduced volatile materials by distillation in the later stages of the reaction. Other methods of preventing the premature removal of the relatively low boiling vinyl-containing chlorosilane will be apparent to those skilled in the art. Typically the reaction is carried out for about 1 to 48 hours although other time durations may be employed.

The resulting polysilane is of the average formula

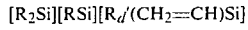

where there is from 0 to 60 mole percent [R₂Si] units, 30 to 99.5 mole percent [RSi] units, and 0.5 to 15 mole percent [R$_d'$(CH₂=CH)Si] units. The remaining bonds on silicon in the inventive polysilane are attached to other silicon atoms and chlorine or bromine atoms. Typically the chlorine-endblocked or bromine-endblocked vinyl-containing polysilane will contain from about 10 to 38 weight percent, based on the weight of the polysilane, hydrolyzable chlorine or 21–58 weight percent, based on the weight of the polysilane, hydrolyzable bromine.

The chlorine-endblocked or bromine-endblocked vinyl-containing polysilane may be pyrolyzed in an inert atmosphere or in a vacuum to obtain a silicon carbide ceramic material. The polymer may be formed into fibers or other shaped articles prior to pyrolysis if desired. The chlorine or bromine atoms in the chlorine-endblocked or bromine-endblocked vinyl-containing polysilane are very reactive. This reactivity makes the handling of these polysilanes difficult. These polysilanes are especially difficult to handle when a low oxygen containing ceramic material is desired. Therefor it is preferred that the chlorine or bromine endblocking groups be replaced with less reactive endblocking groups.

One preferred polysilane with less reactive endblocking group may be prepared by reacting the chlorine-endblocking or bromine-endblocking vinyl-containing polysilane, under anhydrous conditions, with an alkyl, vinyl or phenyl Grignard reagent of general formula $R'MgX'$ or with an organolithium compound of general formula $R'Li$ where $R'$ is an alkyl radical containing 1 to 4 carbon atoms, a vinyl radical, or a phenyl radical and $X'$ is chlorine or bromine.

The Grignard reagents useful herein are those reagents commonly known in the art for Grignard type reactions. Such materials are, for example, alkyl magnesium halides and aryl magnesium halides. For purposes of this invention, it is preferred to use Grignard reagents having the general formula $R'MgX'$ wherein $R'$ is an alkyl radical of 1 to 4 carbon atoms, a vinyl radical or a phenyl radical and $X'$ is either chlorine or bromine. Most preferred Grignard reagents are CH₃MgCl, (CH₂=CH)MgCl and (C₆H₅)MgCl. Typical Grignard reaction solvents can be used herein. Preferred are alkyl ethers and tetrahydrofuran.

The organolithium compounds useful herein are of the general formula $R'Li$ wherein $R'$ is an alkyl radical of 1 to 4 carbon atoms, a vinyl radical, or a phenyl radical. Suitable solvents for the organolithium compounds include toluene, xylene, benzene, tetrahydrofuran and ethers.

Combinations of Grignard reagents and/or organolithium compounds may also be used.

For best results, dry reaction conditions should be observed. Solvents for the starting chlorine-endblocked or bromine-endblocked vinyl-containing polysilane can be any organic solvent in which the material is soluble and which does not react with the material except in the desired manner. Examples of useful solvents include toluene, xylene, benzene, tetrahydrofuran and ethers. Specifically, toluene is preferred. Generally it has been found preferable to add the chlorine-endblocked or bromine-endblocked vinyl-containing polysilane to an excess of Grignard reagent or organolithium compound, both in a solvent solution. This addition and reaction is carried out while the materials are stirred or otherwise agitated. The reaction is carried out in a dry inert atmosphere such as in the presence of nitrogen or argon gas to prevent the introduction of water into the reaction vessel. The reaction can be run at temperatures of 0° to 120° C. but preferably the reaction is run at room temperature or slightly below room temperature to prevent or decrease undesirable side reactions. After the addition of the reagent is complete, the reaction mixture is stirred for a time, with or without heating, to ensure the completion of the reaction. Typically the reaction is carried out for a time period of about 1 to 48 hours. Excess Grignard reagent or organolithium compound is then destroyed using water, HCl or an alcohol. The reaction mixture is cooled to room temperature and then filtered by convention means and the solvents and other volatile materials are then removed by stripping under vacuum with the addition of heat. The resulting polysilanes are solids. The resulting polysilanes are of the general formula $$[R_2Si][RSi][R_d'(CH_2\!=\!CH)Si]$$

where there are from 0 to 60 mole percent [$R_2Si$] units, 30 to 99.5 mole percent [RSi] units, and 0.5 to 15 mole percent [$R_d'(CH_2\!=\!CH)Si$] units and where the remaining bonds on silicon are attached to other silicon atoms and alkyl radicals containing 1 to 4 carbon atoms, vinyl radicals or phenyl radicals.

Another preferred polysilane with less reactive end-blocking groups may be prepared by reacting the chlorine-endblocked or bromine-endblocked vinyl-containing polysilane, under anhydrous conditions, with a reagent selected from the group consisting of (i) carbinols having the general formula R'''OH, (ii) alcoholates having the general formula R'''OM, and (iii) alkyl orthoformates having the general formula $(R^{iv}O)_3CH$ where R''' is an alkyl radical containing 1 to 4 carbon atoms or a phenyl radical, $R^{iv}$ is an alkyl radical containing 1 to 4 carbon atoms, and M is sodium, potassium, or lithium. By treatment with such reagents the chlorine-endblocking or bromine-endblocking groups are replaced by endblocking groups of formula R'''O— and $R^{iv}O$—.

The treating reagents are of three different types; namely, carbinols having the general formula R'''OH; alcoholates having the general formula R'''OM and alkyl orthoformates having the general formula $(R^{iv}O)_3CH$ in which R''' is an alkyl group of 1–4 carbon atoms and phenyl, $R^{iv}$ is an alkyl group of 1–4 carbon atoms, and M is sodium, potassium or lithium. Specific examples of materials useful in this invention are $CH_3OH$, $CH_3CH_2OH$, $CH_3(CH_2)_3OH$, $NaOCH_3$, $KOCH_3$, $LiOCH_2CH_3$, $(CH_3O)_3CH$, $(CH_3CH_2O)_3CH$ and phenol. Preferred for this invention are the alkyl orthoformates and alcoholates. Most preferred is $NaOCH_3$. A combination of these reagents may also be employed.

Generally, the reagent is used in a stoichiometric excess based on the amount of halogen present in the chlorine-endblocked or bromine-endblocked vinyl-containing polysilane to ensure that the alcoholysis reaction is enhanced. Excess reagent as well as any solvents and byproducts can be stripped or strip distilled at the end of the reaction.

For best results, dry reaction conditions should be observed. Solvents for the starting polyhalosilanes can be any organic solvent in which the material is soluble and which does not react with the material except in the desired manner. Examples of useful solvents include toluene, xylene, benzene, tetrahydrofuran and ethers. Specifically, toluene is preferred. Generally, the order of addition of the components is not critical, but it has been found preferable to add the neat reagent to the chlorine-endblocked or bromine-endblocked vinyl-containing polysilane in a solvent solution, such as toluene. This addition and reaction is carried out while the materials are stirred or otherwise agitated. The reaction is carried out in a dry inert atmosphere such as in the presence of nitrogen or argon gas to prevent the introduction of water into the reaction vessel. After the addition of the reagent is complete, the reaction mixture is stirred for a time, with or without heating, to ensure the completion of the reaction. Typically the reaction time is about 1.5 to 65 hours. The reaction can be run at temperatures of 25° to 110° C. but preferably the reaction is run at reflux temperature. The reaction mixture is cooled to room temperature and then filtered by conventional means and the solvents and other volatile materials are then removed by stripping under vacuum with or without the addition of heat. The resulting polysilanes are solids at room temperature. The resulting polysilanes are of the general formula $$[R_2Si][RSi][R_d'(CH_2\!=\!CH)Si]$$

where there are from 0 to 60 mole percent [$R_2Si$] units, 30 to 99.5 mole percent [RSi] units, and 0.5 to 15 mole percent [$R_d'(CH_2\!=\!CH)Si$] units and where the remaining bonds on silicon are attached to other silicon atoms and radicals of formula R'''O— and $R^{iv}O$—.

Another preferred polysilane with less reactive end-blocking groups may be prepared by reacting the chlorine-endblocked or bromine-endblocked vinyl-containing polysilane, under anhydrous conditions, with an aminolysis reagent of general formula $NHR_2^v$ wherein $R^v$ is hydrogen, an alkyl radical containing 1 to 4 carbon atoms, a phenyl radical, or a —$SiR_3$ radical where R is an alkyl radical containing 1 to 4 carbon atoms. By treatment with such aminolysis reagents the chlorine-endblocking or bromine-endblocking groups are replaced by endblocking groups of formula —$NR_2^v$.

The aminolysis reagents useful in this invention are ammonia or substituted or unsubstituted organic amines having the general formula $NHR_2^v$ where $R^v$ is an alkyl radical of 1 to 4 carbon atoms, a phenyl radical, or a —$SiR_3$ radical where R is an alkyl radical of 1 to 4 carbon atoms. Examples of such materials include $NH_3$, $CH_3NH_2$, $C_4H_9NH_2$, $(CH_3)_2NH$, $(CH_3)_3SiNH_2$, and aniline. Most preferred are $C_4H_9NH_2$ and aniline. Combinations of these aminolysis reagents may also be employed. Generally, the aminolysis reagent is used in a stoichiometric excess based on the amount of halogen present in the chlorine-endblocked or bromine-endblocked vinyl-containing polysilane to ensure that the aminolysis reaction is enhanced. Excess reagent as well as any solvents and byproducts can be stripped or strip distilled at the end of the reaction.

For best results, dry reaction conditions should be observed. Solvents for the starting chlorine-endblocked or bromine-endblocked vinyl-containing polysilane can be any organic solvent in which the material is soluble and which does not react with the material except in the desired manner. Examples of useful solvents include toluene, xylene, benzene, tetrahydrofuran and ethers. Specifically, toluene is preferred. Generally, the order of addition of the components is not critical, but it has been found preferable to add the neat aminolysis reagent to the chlorine-endblocked or bromine-endblocked vinyl-containing polysilane in a solvent solution, such as toluene. This addition and reaction is carried out while the materials are stirred or otherwise agitated. The reaction is carried out in a dry inert atmosphere such as in the presence of nitrogen or argon gas to prevent the introduction of water into the reaction vessel. After the addition of the aminolysis reagent is complete, the reaction mixture is stirred for a time, with or without heating, to ensure the completion of the reaction. Typically the reaction time is about 3 to 96 hours. The reaction can be run at temperatures of 25° to 100° C. but preferably the reaction is run at reflux temperature. The reaction mixture is cooled to room temperature and then filtered by conventional means and the solvents and other volatile materials are then removed by stripping under vacuum with or without the addition of heat. The resulting polysilanes are solids at room temperature. The resulting polysilanes are of the general formula $$[R_2Si][RSi][R_d'(CH_2=CH)Si]$$

where there are from 0 to 60 mole percent $[R_2Si]$ units, 30 to 99.5 mole percent $[RSi]$ units, and 0.5 to 15 mole percent $[R_d'(CH_2=CH)Si]$ units and where the remaining bonds on silicon are attached to other silicon atoms and radicals of the formula $-NR_2^v$.

The preferred polysilanes of this invention are polysilanes of the general formula $$[R_2Si][RSi][R_d'(CH_2=CH)Si]$$

where the remaining bonds on silicon are attached to other silicon atoms and $-R'$, or $-OR'''$, or $-NR_2^v$ radicals. These preferred polysilanes may contain chlorine or bromine atoms and still be useful in this invention. The chlorine or bromine content of these preferred polysilanes is, however, less than the chlorine or bromine content of the starting chlorine-endblocked or bromine-endblocked vinyl-containing polysilanes. Preferably the $-R'$, $-OR'''$, or $-NR_2^v$ endblocked vinyl-containing polysilanes contain less than 5 weight percent chlorine or bromine; most preferably they contain less than 2 weight percent chlorine or bromine; and most preferably they contain less than 1 weight percent chlorine or bromine. The reduced levels of chlorine or bromine in these preferred polysilanes result in easier and safer handling of the preferred polysilanes relative to the chlorine-endblocked or bromine-endblocked vinyl-containing polysilane.

The most preferred polysilane of this invention is the $-R'$ endblocked vinyl-containing polysilane where $-R'$ is an alkyl radical containing 1 to 4 carbon atoms, a vinyl radical, or a phenyl radical.

The $-R'$, $-OR'''$, or $-NR_2^v$ endblocked vinyl-containing polysilanes may be fired in an inert atmosphere or in a vacuum to an elevated temperature of at least 800° C. until a silicon carbide ceramic material is obtained. Preferably the pyrolysis temperature is 1000° C. or higher. Most preferably the pyrolysis temperature is 1200° to 1500° C. The polysilanes may be formed into shaped articles prior to pyrolysis. Fibers are one especially preferred shaped article. When preparing fibers it is preferred that the polysilanes of this invention have a softening point of about 50° to 200° C.

The polysilanes of this invention may be cured, and thereby rendered infusible, prior to pyrolysis. The curing may be accomplished by heating the polysilane to a temperature below the softening point of the polysilane in air. Curing by heat in an oxygen-containing atmosphere will result in significant oxygen content in the resulting ceramic material. Therefore it is preferred that the polysilanes of this invention be cured by exposure to ultraviolet (UV) light prior to pyrolysis. Curing by exposure to UV light is made possible by the presence of the vinyl group which, in the polysilanes, has a maximum UV absorption in the general 200-245 nm range. For fibers, a UV exposure time of 0.5 to 20 minutes at a dosage rate of about 100 mJ/cm² is sufficient. For other shapes and dosage rates the dosage time required may be different and should be determined experimentally. Toluene solubility may be used as a screening test for a determination of dosage rates and UV exposure times required. The uncured polysilane is soluble in toluene whereas the cured, infusible polysilane is insoluble or mostly insoluble in toluene. The final test for the sufficiency of dosage rate and exposure time must be when the polysilane is fired to a ceramic material. If the shaped article, for example, fibers, do not fuse together or otherwise lose their shape then the exposure employed for curing was sufficient. The polysilanes of this invention may be cured by UV irradiation either in an inert atmosphere or in air. If a ceramic material with reduced oxygen content is desired then curing by UV irradiation in an inert atmosphere is obviously preferred.

The following examples are intended to illustrate the invention and are not intended to limit the invention.

In the following examples, the analytical methods used were as follows:

Percent chlorine (residual) was determined by fusion of the halides with sodium peroxide and potentiometric titration with silver nitrate.

The penetration temperature was determined on a Thermomechanical Analyzer, Model 1090, from Dupont Instruments. The penetration temperature is related to the softening point.

Carbon, hydrogen, and nitrogen were determined on a C, H, N Elemental Analyzer, Model 1106, manufactured by Carlo Erba Strumentazione of Italy. The sample was combusted at 1030° C. and then passed over a chromium oxide bed at 65° C. and a copper bed at 650° C. The $N_2$, $CO_2$, and $H_2O$ produced were then separated and detected using a thermal conductivity detector.

Oxygen was determined using a Leco Oxygen Analyzer equipped with an Oxygen Determinater 316 (Model 783700) and an Electrode Furnace EF100 (Model 77600) manufactured by Leco Corporation, St. Joseph, Mich. The method includes the high temperature carbothermic reduction to CO with CO analysis by IR.

Thermogravimetric analyses (TGA) were carried out on a Netzsch STA 429 (2400° C.) TGA instrument manufactured by Netzsch Instruments, Selb, West Germany. Sample size was 30-40 mg; heating rate was 10° C. per minute; helium gas flow was 100 or 200 cc per minute; and the sample crucible was $Al_2O_3$.

The polysilanes were fired to elevated temperature using an Astro Industries Furnace 1000A (water cooled graphite heated model 1000.3060-FP-12) or a Lindberg furnace (Heavy Duty SB Type S4877A).

Percent silicon was determined by a fusion technique which consisted of converting the silicon material to soluble forms of silicon and then analyzing the soluble material quantitatively for total silicon by atomic absorption spectrometry.

EXAMPLE 1

A mixture of methylchlorodisilanes (1237.4 g) and phenylvinyldichlorosilane (65.1 g) were reacted in the presence of tetra-n-butylphosphonium chloride (13.0 g) as catalyst. The mixture of methylchlorodisilanes was a redistilled Direct Process Residue and contained 50.2 weight percent $CH_3Cl_2SiSiCl_2CH_3$, 35.8 weight percent $(CH_3)_2ClSiSiCl_2CH_3$, 12.4 weight percent $(CH_3)_2ClSiSiCl(CH_3)_2$, and 1.6 weight percent low boiling silanes. The catalyst was from Alfa Products, Danvers, Mass. The catalyst was placed in a 2 liter, 3 neck round bottom flask equipped with an air driven stirrer, clasen adaptor, temperature probe coupled with a temperature controller, addition funnel, and distillation apparatus. The apparatus was placed under vacuum for 45 minutes at room temperature and then heated with a heat gun while still under vacuum for an additional 15 minutes to help insure anhydrous conditions. The reaction system was then backfilled with argon. Both the disilane and phenylvinyldichlorosilane were then quickly added under an argon blanket via the addition funnel. The reaction mixture was then heated to 100° C. at a rate of 5° C. per minute and held at 100° C. for about one-half hour while stirring continuously. The temperature was then raised to 250° C. at a rate of 1.5° C. per minute and held at 250° C. for one hour. Throughout the heating process volatile byproducts were distilled from the reaction vessel and collected. A total of 1046 g distillate was collected. The distillate was analyzed by gas liquid chromatography (glc) and found to contain 52.7 weight percent $CH_3SiCl_3$, 23.7 weight percent $(CH_3)_2SiCl_2$, 9.6 weight percent $(CH_3)_2ClSiSiCl(CH_3)_2$, 0.5 weight percent $CH_3Cl_2SiSiCl(CH_3)_2$, 1.5 weight percent $CH_3Cl_2SiSiCl_2CH_3$, and 12.0 weight percent other products. No $C_6H_5(CH_2=CH)SiCl_2$ was found in the distillate. The solid polysilane product (266.6 g) remaining in the reaction vessel was dissolved in xylene and stored under argon. The product yield was 20.3 weight percent. The polysilane product contained 25.9 weight percent chlorine, especially all of which was hydrolyzable. The polysilane is calculated to have 15.8 mole percent [$(CH_3)_2Si$] units, 77.8 mole percent [$CH_3Si$] units, and 6.6 mole percent [$C_6H_5(CH_2=CH)Si$] units based on the starting materials and distillate collected.

EXAMPLE 2

This example demonstrates the reaction of a chlorine-endblocked vinyl-containing polysilane with a methyl Grignard reagent. A methyl Grignard reagent ($CH_3MgCl$, 1.16 moles, 2.8M in tetrahydrofuran) was mixed with 164 ml of xylene in a 2 liter 3-neck flask under argon and cooled to about 2° C. The polysilane prepared in Example 1 (120 g) was added as a xylene solution (210.7 g solution) over a one hour period under an argon purge. The temperature rose to 19° C. The reaction mixture was kept under argon overnight at room temperature. The temperature was raised to reflux and held for 2 hours. After cooling to room temperature the reaction mixture was added to 500 ml distilled water/ice in increments with mixing. The organic layer was collected and washed twice more with distilled water. The collected organic layer was dried with anhydrous $MgSO_4$ and then filtered through a 1.2 micron membrane. The dried organic layer was stripped to 250° C. at 760 mm Hg and to 250° C. at 10 mm Hg. A light brown polysilane (80.1 g) was obtained with a 78.5 weight percent yield. The polysilane contained 42.5 weight percent silicon, 35.4 weight percent carbon, and 8.0 weight percent hydrogen. The total chlorine was 0.62 weight percent with 0.38 weight percent hydrolyzable chlorine. The softening temperature was 81° C. A molecular weight of 1100 g per mole was determined by vapor pressure osmometry using tetrahydrofuran as solvent. The polysilane had a UV maximum at 200–210 nm (nujol mull).

Two bulk samples of this $CH_3$-endblocked vinyl-containing polysilane were fired to 1200° C. under argon in the Lindberg furnace. The temperature was raised at 10.7° C. per minute with a total firing time of 1 hour and 50 minutes. An amorphous SiC ceramic was obtained with an average yield of 48.4 weight percent. The ceramic contained 62.6 weight percent silicon, 32.8 weight percent carbon, undetectable hydrogen, and 3.2 weight percent oxygen.

A bulk sample of this polysilane was fired to 1600° C. under argon in the Astro furnace. The temperature was heaed at a rate of 5.5° C. per minute to 1600° C. and held at 1600° C. for 12 minutes. The resulting ceramic material contained 28 weight percent beta-silicon carbide by X-ray diffraction.

EXAMPLE 3

This example shows the preparation of ceramic fibers from a vinyl-containing polysilane. The $CH_3$-endblocked vinyl-containing polysilane of Example 2 was employed. For one fiber sample a melt rheometer equipped with a one-half inch barrel, a ram piston with a 7.8 pound weight, and a 0.5 mm spinnerette was employed. The total pressure on the polysilane sample was about 40 psi. At a temperature of 135°–145° C. an extruded fiber that could be continuously drawn down to 30–60 micron was obtained.

A second fiber sample was prepared with a melt rheometer equipped with a ¾ inch barrel and a 0.5 mm spinnerette with an argon pressure of 40 psi. At 148°–149° C. a fiber was continuously spun at a rate of about 1175 cm per minute. Spinning was continuously for 20 minutes. Fiber diameters of 70–100 microns were obtained.

All fiber samples were stored under argon until used. One sample of fibers (spun at 135°–145° C.) was cured by exposure to air at 100° C. for six hours. The air-cured fibers were fired to 1200° C. at a rate of 10.7° C. per minute in argon in the Lindberg furnace. The black ceramic fibers retained their shape during pyrolysis.

Another set of fibers (spun at 135°–145° C.) were sealed in a quartz tube under argon and cured by exposure for 20 minutes to UV light from an Ace Hanovia medium pressure mercury light. The fibers were unchanged in appearance after the UV cure. The UV cured fibers were pyrolyzed under argon to 1200° C. as before. The fibers, which were black, retained their shape during the pyrolysis.

Another set of fibers (spun at 148°–149° C.) was cured in air by exposure to UV light. The light source was Ashdu model UV-12H/2 system. Exposure per pass was 112 mJ/cm². The total exposure was 6720 mJ/cm². There was a slight flow with the fiber during the cure due to heat from the light source. The cured fibers kept their shape upon being converted to SiC fibers by pyrolysis to 1200° C. under argon using the Lindberg furnace at a heating rate of 10.7° C. The light exposure was reduced to about 900 mJ/cm² for a second set of these same fibers. Curing and pyrolysis conditions were otherwise unchanged. During pyrolysis of the low UV exposure cured fibers there was some flow for the thicker fibers but otherwise the fibers kept their shape.

Pyrolysis of uncured fibers under similar conditions results in fibers which lose their shape and tend to fuse together.

EXAMPLE 4

A mixture of disilanes from the direct process (1265.5 g), phenylvinyldichlorosilane (39.7 g) and tetrabutylphosphonium chloride (13.0 g) were reacted as in Example 1. The mixture of disilanes was the same as in Example 1. After completion of the reaction the product was taken up in 250 ml toluene. About 239 g of the chlorine-endblocked vinyl containing polysilane product was obtained which corresponds to a 18.1 weight percent yield. The resulting polysilane contained 28.8 weight percent total chlorine and 20.2 weight percent hydrolyzable chlorine. During the reaction 1075 g of distillate was collected. The distillate was analyzed as in Example 1 and was found to contain the following: $CH_3SiCl_3$, 53.3 weight percent; $(CH_3)_2SiCl_2$, 28.4 weight percent; $C_6H_5(CH_2=CH)SiCl_2$, 0.8 weight percent; $(CH_3)_2ClSiSiCl(CH_3)_2$, 10.9 weight percent; $CH_3Cl_2SiSiCl(CH_3)_2$, 0.5 weight percent; $CH_3Cl_2SiSiCl_2CH_3$, 1.9 weight percent; and other unidentified species. 4.2 weight percent. Based on the starting materials and the distillate the polysilane was calculated to contain 90.7 mole percent $[CH_3Si]$ units, 5.4 mole percent $[(CH_3)_2Si]$ units, and 3.9 mole percent $[C_6H_5(CH_2=CH)Si]$ units.

EXAMPLE 5

This example shows the reaction of the chlorine-endblocked vinyl-containing polysilane of Example 4 with a methyl Grignard reagent. The polysilane (150 g) in a toluene solution (307 g total solution) was reacted with $CH_3MgCl$ (1.46 moles, 443 ml of a 3.3M solution in tetrahydrofuran) in a toluene solvent using the procedures described in Example 2. A red-brown $CH_3$-endblocked vinyl-containing polysilane (111.6 g) was obtained with a 89.2 weight percent yield. The solid polysilane was stored under argon in an amber colored container. The polysilane contained 48.9 weight percent silicon, 31.5 weight percent carbon, and 7.7 weight percent hydrogen. The total chlorine content of the polysilane was 1.1 weight percent. An absorption maximum was observed at 200 nm in the UV spectrum (nujol mull). The softening point of the polysilane was 116° C.

A bulk sample of this polysilane was fired to 1200° C. at a rate of 10.7° C. per minute under argon in the Lindberg furnace. An amorphous silicon carbide ceramic was obtained with a ceramic yield of 46.8 weight percent. The ceramic had a chlorine content of about 0.9 weight percent. The ceramic contained 30.6 weight percent carbon, nondetectable hydrogen, and 5.0 weight percent oxygen.

A sample of the $CH_3$-endblocked vinyl containing polysilane was analyzed a Netzsch Thermogravimetric Analyzer (TGA). The heating rate was about 10° C. per minute and a flow of helium was maintained throughout the analysis. From room temperature to 600° C. the sample lost 42 percent of its original weight; from 600° to 1500° C. a weight loss of about 1 weight percent was observed; the temperature was then raised to 1550° C. and held for 25 minutes during which time an additional weight loss of 19 percent was noted. Overall the weight loss to 1500° C. was 42 weight percent. The overall weight loss of the sample when heated to 1550° C. and held at 1550° C. for 25 minutes was 61 weight percent.

EXAMPLE 6

A sample (1240 g) of the same mixture of methylchlorodisilanes as used in Example 1 was reacted with 65.3 g of phenylvinyldisilane using 13.0 g of tetra-n-butylphosphonium chloride as catalyst. The procedure described in Example 1 was employed. The solid chlorine-endblocked vinyl containing polysilane (265 g) was obtained in a 20.1 weight percent yield and stored as a toluene solution under argon. About 1045 g of distillate was collected during the reaction. The distillate contained 55.3 weight percent $CH_3SiCl_3$, 24.9 weight percent $(CH_3)_2SiCl_2$, 1.2 weight percent $C_6H_5(CH_2=CH)SiCl_2$, 11.1 weight percent $(CH_3)_2ClSiSiCl(CH_3)_2$, 0.9 weight percent $CH_3Cl_2SiSiCl(CH_3)_2$, 2.0 weight percent $CH_3Cl_2SiSiCl_2CH_3$, and 4.6 weight percent unidentified products. The polysilane is calculated to contain 83.8 mole percent $[CH_3Si]$ units, 10.2 mole percent $[(CH_3)_2Si]$ units, and 5.9 mole percent $[C_6H_5(CH_2=CH)Si]$ units. The chlorine-endblocked polysilane contained 24.3 weight percent total chlorine and 22.5 weight percent hydrolyzable chlorine.

EXAMPLE 7

The chlorine-endblocked vinyl-containing polysilane of Example 6 (145 g) was reacted with a methyl Grignard reagent ($CH_3MgCl$, 488 ml of a 2.8 molar solution in tetrahydrofuran) in toluene using the procedure outlined in Example 2. The $CH_3$-endblocked polysilane (122 g) was obtained in 88.9 weight percent yield. The light to medium brown polysilane solid had a softening point of about 99° C. The polysilane contained 44.7 weight percent silicon, 32.2 weight percent carbon and 7.3 weight percent hydrogen. The total chlorine content was 1.2 weight percent. The $CH_3$-endblocked vinyl-containing polysilane had an absorption maximum at 200–210 nm (nujol mull). A molecular weight of 920 g per mole was determined by vapor pressure osmometry with tetrahydrofuran solvent.

A bulk sample of the $CH_3$-endblocked polysilane was fired to 1200° C. under argon in the Lindberg furnace at a heating rate of 10.7° C. per minute. As amorphorous silicon carbide ceramic was obtained with a 45.2 weight percent ceramic yield. The ceramic contained 32.3 percent carbon and 1.82 weight percent oxygen. The free carbon content (i.e., carbon not as silicon carbide) was 0.30 weight percent. The total chlorine content of the ceramic material was 0.98 weight percent.

Another bulk sample of the $CH_3$-endblocked polysilane was fired to 1600° C. in the Astro furnace under argon. X-ray diffraction analysis of the resulting silicon carbide ceramic indicated 29 weight percent beta-silicon carbide and 16 weight percent alpha-silicon carbide. The ceramic contained 32 weight percent carbon with no detectable hydrogen.

A sample of the $CH_3$-endblocked vinyl containing polysilane was analyzed by TGA under a helium atmosphere. Heating was at a rate of about 10° C. per minute. From room temperature to 600° C. the weight loss was about 42 weight percent; from 600° to 1400° C. an additional weight loss of 4 weight percent was observed; and from 1400° to 1550° C. the weight loss was 15 weight percent. The overall weight loss to 1400° C. was 46 weight percent. The overall weight loss to 1550° C. was 61 weight percent.

EXAMPLE 8

A chlorine-endblocked vinyl-containing polysilane was prepared using a new lot of methylchlorodisilanes which was a redistilled sample of direct process residue. The same procedure as described in Example 1 was employed. The methylchlorodisilane mixture contained 10.7 weight percent $(CH_3)_2ClSiSiCl(CH_3)_2$, 32.5 weight percent $CH_3Cl_2SiSiCl(CH_3)_2$, 55.7 weight percent $CH_3Cl_2SiSiCl_2CH_3$, and 1.1 weight percent low boilers. The methylchlorodisilanes (1332 g) was reacted with 70.6 g of phenylvinyldichlorosilane using 16.2 g of tetra-n-butylphosphonium bromide as catalyst. The chlorine-endblocked polysilane (274 g) was obtained in 19.3 weight percent yield. About 1135 g of distillate was collected during the reaction. The distillate was not analyzed. The total chlorine content of the polysilane was 24.9 weight percent with essentially all of the chlorine being hydrolyzable. The vinyl-containing polysilane had a maximum absorption at 190–210 nm (nujol mull).

EXAMPLE 9

This example shows the reaction of the chlorine-endblocked vinyl-containing polysilane of Example 8 with a mixture of methyl and vinyl Grignard reagents to produce a methyl- and vinyl-endblocked vinyl-containing polysilane. The chlorine-endblocked polysilane (140 g) of Example 8, in a toluene solution, was reacted with $CH_3MgCl$ (301 ml of a 3.3M solution in tetrahydrofuran) and $CH_2=CHMgBr$ (79 ml of a 1.4M solution in tetrahydrofuran) using additional toluene as solvent (total toluene was 548 g). The procedure employed was essentially as described in Example 2 except that the reaction mixture was heated to reflux for ten hours. The brown product (118 g, 97.4 weight percent yield) was stored in an amber-colored container under argon. The softening point of the $CH_3$- and $CH_2=CH$-endblocked polysilane was 111° C. The polysilane contained 46.3 weight percent silicon, 37.6 weight percent carbon, and 7.9 weight percent hydrogen. The total chlorine content was 1.7 weight percent and the hydrolyzable chlorine was 1.5 weight percent. The polysilane had an absorption maximum at 242 nm with an extinction coefficient of 3750 (solution spectra, chloroform solvent).

A bulk sample of the $CH_3$- and $CH_2=CH_2$-endblocked polysilane was fired to 1200° C. at a rate of 10.7° C. per minute in the Lindberg furnace in an argon atmosphere. An amorphous silicon carbide ceramic was obtained with a 50.5 weight percent ceramic yield. The ceramic material contained 33.2 weight percent carbon, nondetectable levels of hydrogen, 0.9 weight percent chlorine, and 2.3 weight percent oxygen.

TGA with the $CH_3$- and $CH_2=CH$-enblocked polysilane gave a 46 percent weight loss upon raising the temperature from room temperature to 600° C. From 600° to 1500° C. an additional 4 percent weight loss was observed. When the temperature was raised from 1500° to 1550° C. and held at 1550° C. for 15 minutes an additional 7 percent weight loss was noted. The overall weight loss to 1500° C. was 50 weight percent.

EXAMPLE 10

When the chlorine-endblocked vinyl-containing polysilane, as, for example, produced in Examples 1, 4, 6, and 8, is reacted with either carbinols such as $CH_3OH$, or alcoholates such as $CH_3ONa$, or alkyl orthoformates such as $(CH_3O)_3CH$ at a temperature of 25° to 100° C. in toluene, a $CH_3O$-enblocked vinyl containing polysilane will be obtained. The $CH_3O$-enblocked vinyl-containing polysilane may be converted to a ceramic material by pyrolysis to elevated temperatures in an inert atmosphere or in a vacuum.

EXAMPLE 11

When the chlorine-endblocked vinyl-containing polysilane, as, for example, produced in Examples 1, 4, 6, and 8, is reacted with an aminolysis reagent of general formula $NHR_2^v$ where $R^v$ is hydrogen, an alkyl radical of 1 to 4 carbon atoms, a phenyl radical, or a $-SiR_3$ radical (where R is alkyl radical containing 1 to 4 carbon atoms, a vinyl radical or a phenyl radical at a temperature of 25° to 100° C. in toluene, a $R^vNH$-endblocked vinyl-containing polysilane will be obtained. The $R^vNH$-endblocked vinyl-containing polysilane may be converted to a ceramic material by pyrolysis to elevated temperatures in an inert atmosphere or in a vacuum.

What is claimed is:

1. A method of preparing a polysilane having the average formula $$[R_2Si][RSi][R_d'(CH_2=CH)Si]$$

wherein the remaining bonds on silicon are attached to other silicon atoms, and chlorine atoms or bromine atoms, said method consisting of treating a mixture consisting essentially of 80 to 99 weight percent of one or more disilanes of general formula $$[R_bX_cSi]_2$$

and 1 to 20 weight percent of one or more silanes of general formula $$R_d'(CH_2=CH)SiX_{(3-d)}$$

with about 0.001 to 10 weight percent of a catalyst at a temperature of about 100° to 340° C. while distilling byproduced volatile materials until there is produced a chlorine-containing or bromine-containing polysilane, which is a solid at 25° C., having the average formula $$[R_2Si][RSi][R_d'(CH_2=CH)Si]$$

in which polysilane there is from 0 to 60 mole percent $[R_2Si]$ units, 30 to 99.5 mole percent $[RSi]$ units, 0.5 to 15 mole percent $[R_d'(CH_2=CH)Si]$ units, where the remaining bonds on silicon in said polysilane are attached to other silicon atoms and chlorine atoms or bromine atoms; wherein said catalyst is selected from the group consisting of ammonium halides, tertiary organic amines, quaternary ammonium halides, quaternary phosphonium halides, hexamethylphosphoramide, and silver cyanide; wherein R is an alkyl radical containing from 1 to 4 carbon atoms; wherein b has a value of 0 to 2.5, c has a value of 0.5 to 3, and (b+c) equals three; wherein X is chlorine or bromine; wherein R' is an alkyl radical containing 1 to 4 carbon atoms, a vinyl radical, or a phenyl radical; wherein d is 1 or 2; and wherein said one or more silanes have a boiling point greater than 100° C. at 760 mm Hg.

2. A method as defined in claim 1 wherein said catalyst is selected from the group consisting of quaternary ammonium halides having the formula $R_4''NX'$, quaternary phosphonium halides having the formula $R_4''PX'$, and hexamethylphosphoramide wherein X' is chlorine or bromine and R'' is an alkyl radical containing 1 to 6 carbon atoms or an aryl radical and where said catalyst is present at a level of 0.1 to 10 weight percent.

3. A method of preparing a second polysilane having the average formula $$[R_2Si][RSi][R_d'(CH_2=CH)Si]$$

wherein the remaining bonds on silicon are attached to other silicon atoms and alkyl radicals of 1 to 4 carbon atoms, vinyl radicals or phenyl radicals, which method consists of (A) reacting under anhydrous condition, a first polysilane with an alkyl, vinyl or phenyl Grignard reagent having the general formula R'MgX' or an organolithium compound having the general formula R'Li at a temperature of 0° to 120° C., in a suitale solvent, wherein said first polysilane is prepared by treating a mixture consisting essentially of 80 to 99 weight percent of one or more disilanes of general formula $$[R_b X_c Si]_2$$

and 1 to 20 weight percent of one or more silanes of general formula $$R_d'(CH_2=CH)SiX_{(3-d)}$$

with about 0.1 to 10 weight percent of a catalyst at a temperature of about 100° to 340° C. while distilling byproduced volatile materials until there is produced a first polysilane, which is a solid at 25° C., having the average formula $$[R_2Si][RSi][R_d'(CH_2=CH)Si]$$

in which first polysilane there is from 0 to 60 mole percent [R$_2$Si] units, 30 to 99.5 mole percent [RSi] units, 0.5 to 15 mole percent [R$_d'$(CH$_2$=CH)Si] units, where the remaining bonds on silicon in said first polysilane are attached to other silicon atoms and chlorine atoms or bromine atoms; wherein said catalyst is selected from the group consisting of quaternary ammonium halides having the formula R$_4''$NX', quaternary phosphonium halides having the formula R$_4''$PX', and hexamethylphosphoramide; wherein said one or more silanes have a boiling point greater than 100° C. at 760 mm Hg; and wherein R is an alkyl radical containing 1 to 4 carbon atoms, b has a value of 0 to 2.5, c has a value of 0.5 to 3, (b+c) equals three, X is chlorine or bromine, X' is chlorine or bromine, R' is an alkyl radical containing 1 to 4 carbon atoms, a vinyl radical, or a phenyl radical, d is 1 or 2, and R'' is an alkyl radical containing 1 to 6 carbon atoms; and (B) thereafter recovering the second polysilane of average formula $$[R_2Si][RSi][R_d'(CH_2=CH)Si]$$

in which second polysilane there is from 0 to 60 mole percent [R$_2$Si] units, 30 to 99.5 mole percent [RSi] units, 0.5 to 15 mole percent [R$_d'$(CH$_2$=CH)Si] units, and wherein the remaining bonds on silicon in said second polysilane are attached to other silicon atoms and alkyl radicals of 1 to 4 carbon atoms, vinyl radicals, or phenyl radicals.

4. A method of preparing a third polysilane having the average formula $$[R_2Si][RSi][R_d'(CH_2=CH)Si]$$

wherein the remaining bonds on silicon are attached to other silicon atoms and radicals having the formula R'''O— or R$^{iv}$O— where R''' is an alkyl radical containing 1 to 4 carbon atoms or a phenyl radical and R$^{iv}$ is an alkyl radical containing 1 to 4 carbon atoms, which method consists of (A) reacting under anhydrous conditions, a first polysilane with a reagent selected from the group consisting of (i) carbinols having the general formula R'''OH, (ii) alcoholates having the general formula R'''OM, and (iii) alkyl orthoformates having the general formula (R$^{iv}$O)$_3$CH at a temperature of 0° to 110° C., in a suitable solvent, wherein said first polysilane is prepared by treating a mixture consisting essentially of 80 to 99 weight percent of one or more disilanes of general formula $$[R_b X_c Si]_2$$

and 1 to 20 weight percent of one or more silanes of general formula $$R_d'(CH_2=CH)SiX_{(3-d)}$$

with about 0.1 to 10 weight percent of a catalyst at a temperature of about 100° to 340° C. while distilling byproduced volatile materials until there is produced a first polysilane, which is a solid at 25° C., having the average formula $$[R_2Si][RSi][R_d'(CH_2=CH)Si]$$

in which first polysilane there is from 0 to 60 mole percent [R$_2$Si] units, 30 to 99.5 mole percent [RSi] units, 0.5 to 15 mole percent [R$_d'$(CH$_2$=CH)Si] units, where the remaining bonds on silicon in said polysilane are attached to other silicon atoms and chlorine atoms or bromine atoms; wherein said catalyst is selected from the group consisting of quaternary ammonium halides having the formula R$_4''$NX', quaternary phosphonium halides having the formula R$_4''$PX', and hexamethylphosphoramide; wherein said one or more silanes have a boiling point greater than 100° C. at 760 mm Hg; and wherein R is an alkyl radical containing from 1 to 4 carbon atoms, b has a value of 0 to 2.5, c has a value of 0.5 to 3, (b+c) equals there, X is chlorine or bromine, X' is chlorine or bromine, R' is an alkyl radical containing 1 to 4 carbon atoms, a vinyl radical, or a phenyl radical, d is 1 or 2, R''' is an alkyl radical containing 1 to 4 carbon atoms or a phenyl radical, R$^{iv}$ is an alkyl radical containing 1 to 4 carbon atoms, and M is sodium, potassium, or lithium; and (B) thereafter recovering the third polysilane of average formula $$[R_2Si][RSi][R_d'(CH_2=CH)Si]$$

in which third polysilane there is from 0 to 60 mole percent [R$_2$Si] units, 30 to 99.5 mole percent [RSi] units, 0.5 to 15 mole percent [R$_d'$(CH$_2$=CH)Si] units, and wherein the remaining bonds on silicon in said third polysilane are attached to other silicon atoms and to the R'''O— or R$^{iv}$O— radicals.

5. A method of preparing a fourth polysilane having the average formula $$[R_2Si][RSi][R_d'(CH_2=CH)Si]$$

wherein the remaining bonds on silicon are attached to other silicon atoms and radicals having the formula —NHR$^v$ wherein R$^v$ is hydrogen, an alkyl radical containing 1 to 4 carbon atoms, a phenyl radical or a —SiR$_3$ radical where R is an alkyl radical containing 1 to 4 carbon atoms, which method consists of (A) reacting under anhydrous conditions, a first polysilane with an aminolysis reagent having the general formula $NHR_2^v$ at a temperature of from 25° to 100° C., in a suitable solvent, wherein said first polysilane is prepared by treating a mixture consisting essentially of 80 to 99 weight percent of one or more disilanes of general formula $$[R_bX_cSi]_2$$

and 1 to 20 weight percent of one or more silanes of general formula $$R_d'(CH_2=CH)SiX_{(3-d)}$$

with about 0.001 to 10 weight percent of a catalyst at a temperature of about 100° to 340° C. while distilling byproduced volatile materials until there is produced a first polysilane, which is a solid at 25° C., having the average formula $$[R_2Si][RSi][R_d'(CH_2=CH)Si]$$

in which first polysilane there is from 0 to 60 mole percent [$R_2Si$] units, 30 to 99.5 mole percent [$RSi$] units, 0.5 to 15 mole percent [$R_d'(CH_2=CH)Si$] units, where the reamining bonds on silicon in said polysilane are attached to other silicon atoms and chlorine atoms or bromine atoms; wherein said catalyst is selected from the group consisting of quaternary ammonium halides having the formula $R_4''NX'$, quaternary phosphonium halides having the formula $R_4''PX'$, and hexamethylphosphoramide; wherein said one or more silanes has a boiling point greater than 100° C. at 760 mm Hg; and wherein R is an alkyl radical containing 1 to 4 carbon atoms, b has a value of 0 to 2.5, c has a value of 0.5 to 3, (b+c) equals three, X is chlorine or bromine, X' is chlorine or bromine, R' is an alkyl radical containing 1 to 4 carbon atoms, a vinyl radical, or a phenyl radical, d is 1 or 2, and $R^v$ is hydrogen, an alkyl radical containing 1 to 4 carbon atoms, a phenyl radical or a —$SiR_3$ radical where R is an alkyl radical containing 1 to 4 carbon atoms; and (B) thereafter recovering the fourth polysilane of average formula $$[R_2Si][RSi][R_d'(CH_2=CH)Si]$$

in which fourth polysilane there is from 0 to 60 mole percent [$R_2Si$] units, 30 to 99.5 mole percent [$RSi$] units, 0.5 to 15 mole percent [$R_d'(CH_2=CH)Si$] units, and wherein the remaining bonds on silicon in said fourth polysilane are attached to other silicon atoms and —$NHR^v$ radicals.

6. A method as defined in claim 2 wherein said polysilane is prepared by treating said mixture at a temperature of 150° to 340° C. and wherein one or more of said silanes have a boiling point greater than 150° C. at 760 mm Hg.

7. A method as defined in claim 3 wherein said first polysilane is prepared by treating said mixture at a temperature of 150° to 340° C. and wherein one or more of said silanes have a boiling point greater than 150° C. at 760 mm Hg.

8. A method as defined in claim 4 wherein said first polysilane is prepared by treating said mixture at a temperature of 150° to 340° C. and wherein one or more of said silanes have a boiling point greater than 150° C. at 760 mm Hg.

9. A method as defined in claim 5 wherein said first polysilane is prepared by treating said mixture at a temperature of 150° to 340° C. and wherein one or more of said silanes have a boiling point greater than 150° C. at 760 mm Hg.

10. A method as defined in claim 6 wherein said disilanes are from a Direct Process residue, wherein R is methyl and X is chlorine, and wherein d is 1 in said silanes.

11. A method as defined in claim 7 wherein said disilanes are from a Direct Process residue, wherein R is methyl and X is chlorine, and wherein d is 1 in said silanes.

12. A method as defined in claim 8 wherein said disilanes are from a Direct Process residue, wherein R is methyl and X is chlorine, and wherein d is 1 in said silanes.

13. A method as defined in claim 9 wherein said disilanes are from a Direct Process residue, wherein R is methyl and X is chlorine, and wherein d is 1 in said silanes.

14. A method as defined in claim 10 wherein there is one silane and said silane is phenylvinyldichlorosilane.

15. A method as defined in claim 11 wherein there is one silane and said silane is phenylvinyldichlorosilane.

16. A method as defined in claim 12 wherein there is one silane and said silane is phenylvinyldichlorosilane.

17. A method as defined in claim 13 wherein there is one silane and said silane is phenylvinyldichlorosilane.

18. A polysilane as prepared by the method of claim 1.

19. A polysilane as prepared by the method of claim 2.

20. A second polysilane as prepared by the method of claim 3.

21. A third polysilane as prepared by the method of claim 4.

22. A fourth polysilane as prepared by the method of claim 5.

23. A polysilane as prepared by the method of claim 10.

24. A second polysilane as prepared by the method of claim 11.

25. A third polysilane as prepared by the method of claim 12.

26. A fourth polysilane as prepared by the method of claim 13.

27. A polysilane of the average formula $$[R_2Si][RSi][R_d'(CH_2=CH)Si]$$

in which polysilane there is from 0 to 60 mole percent [$R_2Si$] units, 30 to 99.5 mole percent [$RSi$] units and 0.5 to 15 mole percent [$R_d'(CH_2=CH)Si$] units, where the remaining bonds on silicon are attached to other silicon atoms, said alkyl radicals of 1 to 4 carbon atoms, vinyl radicals or phenyl radicals wherein R is an alkyl radical containing 1 to 4 carbon atoms, R' is an alkyl radical containing 1 to 4 carbon atoms, a vinyl radical, or a phenyl radical, and d is 1 or 2.

28. A polysilane as defined in claim 27 wherein said polysilane contains 3 to 20 mole percent [$R_2Si$] units, 70 to 95 mole percent [$RSi$] units, and 2 to 10 mole percent [$R_d'(CH_2=CH)Si$] units.

29. A polysilane as defined in claim 28 wherein R and R' are methyl radicals, d is equal to 1 and the remaining bonds on silicon in said polysilane are attached to other silicon atoms and methyl or vinyl radicals.

30. A polysilane of the average formula $$[R_2Si][RSi][R_d'(CH_2=CH)Si]$$

in which polysilane there is from 0 to 60 mole percent [R$_2$Si] units, 30 to 99.5 mole percent [RSi] units and 0.5 to 15 mole percent [R$_d'$(CH$_2$=CH)Si] units wherein the remaining bonds on silicon are attached to other silicon atoms and radicals having formula R'''O—, wherein R is an alkyl radical containing 1 to 4 carbon atoms, R' is an alkyl radical containing 1 to 4 carbon atoms, a vinyl radical or a phenyl radical, d is 1 or 2, and R''' is an alkyl radical containing 1 to 4 carbon atoms or a phenyl radical.

31. A polysilane as defined in claim 30 wherein said polysilane contains 3 to 20 mole percent [R$_2$Si] units, 70 to 95 mole percent [RSi] units, and 2 to 10 mole percent [R$_d'$(CH$_2$=CH)Si] units.

32. A polysilane as defined in claim 31 wherein R, R', and R''' are methyl radicals and d is equal to 1.

33. A polysilane of the average formula $$[R_2Si][RSi][R_d'(CH_2=CH)Si]$$

in which polysilane there is from 0 to 60 mole percent [R$_2$Si] units, 30 to 99.5 mole percent [RSi] units, and 0.5 to 15 mole percent [R$_d'$(CH$_2$=CH)Si] units wherein the remaining bonds on silicon are attached to other silicon atoms and —NHR$^v$ radicals wherein r is an alkyl radical containing 1 to 4 carbon atoms, R' is an alkyl radical containing 1 to 4 carbon atoms, a vinyl radical or a phenyl radical, d is 1 or 2, and R$^v$ is hydrogen, as alkyl radical containing 1 to 4 carbon atoms, a phenyl radical or a —SiR$_3$ radical.

34. A polysilane as defined in claim 33 wherein said polysilane contains 3 to 20 mole percent [R$_2$Si] units, 70 to 95 mole percent [RSi] units, and 2 to 10 mole percent [R$_d'$(CH$_2$=CH)Si] units.

35. A polysilane as defined in claim 34 wherein R and R' are methyl radicals, R$^v$ is —C$_4$H$_9$ or phenyl, and d is equal to 1.

* * * * *